(12) United States Patent
Stang et al.

(10) Patent No.: US 11,790,196 B2
(45) Date of Patent: *Oct. 17, 2023

(54) INDICIA READER ACOUSTIC FOR MULTIPLE MOUNTING POSITIONS

(71) Applicant: Hand Held Products, Inc., Charlotte, NC (US)

(72) Inventors: Jean-Pierre Stang, Auzeville Tolosane (FR); Wenkang Lu, Suzhou (CN)

(73) Assignee: Hand Held Products, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/804,032

(22) Filed: May 25, 2022

(65) Prior Publication Data

US 2022/0284205 A1 Sep. 8, 2022

Related U.S. Application Data

(63) Continuation of application No. 17/248,916, filed on Feb. 12, 2021, now Pat. No. 11,373,051, which is a
(Continued)

(30) Foreign Application Priority Data

Aug. 4, 2017 (CN) .......................... 201710661845.9

(51) Int. Cl.
*G06K 7/00* (2006.01)
*G06K 7/10* (2006.01)
*H04R 1/02* (2006.01)

(52) U.S. Cl.
CPC ..... *G06K 7/10821* (2013.01); *G06K 7/10128* (2013.01); *G06K 7/10712* (2013.01);
(Continued)

(58) Field of Classification Search
CPC ........ A61B 2562/164; A61B 2562/166; G06K 7/10435; G06K 7/10712
(Continued)

(56) References Cited

U.S. PATENT DOCUMENTS 3,913,877 A 10/1975 Wiener
6,243,260 B1 6/2001 Lundgren et al.
(Continued)

FOREIGN PATENT DOCUMENTS

CN 202995744 U 6/2013
CN 106249869 A 12/2016
(Continued)

OTHER PUBLICATIONS

US 8,548,242 B1, 10/2013, Longacre (withdrawn)
(Continued)

*Primary Examiner* — Daniel St. Cyr
(74) *Attorney, Agent, or Firm* — Alston & Bird LLP

(57) ABSTRACT

An indicia reader can include an indicia-capturing system, an indicia-decoding module, and an audio indicator system having a sound source. An indicia-reader housing can support these components, and the housing includes two adjacent mounting surfaces and a sound port opening formed within a portion of the common edge of the two adjacent surfaces. The indicia reader can be operatively mounted in at least two different positions by attaching one of the two adjacent surfaces to a support structure. The reader's sound port opening is in acoustic communication with the sound source of the audio indicator for transmitting audible indications emitted via the audio indicator system when the indicia reader is mounted in either of the at least two different mounting positions.

20 Claims, 6 Drawing Sheets

Related U.S. Application Data continuation of application No. 16/831,534, filed on Mar. 26, 2020, now Pat. No. 10,956,695, which is a continuation of application No. 16/052,039, filed on Aug. 1, 2018, now Pat. No. 10,635,871.

(52) U.S. Cl.
CPC ......... *G06K 7/10722* (2013.01); *H04R 1/028* (2013.01); *H04R 1/02* (2013.01)

(58) Field of Classification Search
USPC .................................. 235/439, 454, 462.14
See application file for complete search history.

(56) References Cited

U.S. PATENT DOCUMENTS

| | | |
|---|---|---|
| 6,832,725 B2 | 12/2004 | Gardiner et al. |
| 7,128,266 B2 | 10/2006 | Zhu et al. |
| 7,159,783 B2 | 1/2007 | Walczyk et al. |
| 7,266,210 B2 | 9/2007 | Lam et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Van et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein, Jr. |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre, Jr. |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz, Sr. |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |

(56) References Cited

U.S. PATENT DOCUMENTS

| | | |
|---|---|---|
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham, IV |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein, Jr. |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Smith |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,660 B2 | 2/2016 | Lu et al. |
| 9,262,662 B2 | 2/2016 | Chen et al. |
| 9,262,664 B2 | 2/2016 | Soule et al. |
| 9,269,036 B2 | 2/2016 | Bremer |
| 9,270,782 B2 | 2/2016 | Hala et al. |
| 9,274,806 B2 | 3/2016 | Barten |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,282,501 B2 | 3/2016 | Wang et al. |
| 9,286,496 B2 | 3/2016 | Smith |
| 9,292,969 B2 | 3/2016 | Laffargue et al. |
| 9,297,900 B2 | 3/2016 | Jiang |
| 9,298,667 B2 | 3/2016 | Caballero |
| 9,298,964 B2 | 3/2016 | Li et al. |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| 9,319,548 B2 | 4/2016 | Showering et al. |
| D757,009 S | 5/2016 | Oberpriller et al. |
| 9,342,723 B2 | 5/2016 | Liu et al. |
| 9,342,724 B2 | 5/2016 | McCloskey et al. |
| 9,342,827 B2 | 5/2016 | Smith |
| 9,355,294 B2 | 5/2016 | Smith et al. |
| 9,360,304 B2 | 6/2016 | Xue et al. |
| 9,361,882 B2 | 6/2016 | Ressler et al. |

(56) References Cited

U.S. PATENT DOCUMENTS

| | | |
|---|---|---|
| 9,365,381 B2 | 6/2016 | Colonel et al. |
| 9,367,722 B2 | 6/2016 | Xian et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,383,848 B2 | 7/2016 | Daghigh |
| 9,384,374 B2 | 7/2016 | Bianconi |
| 9,390,596 B1 | 7/2016 | Todeschini |
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |
| 9,405,011 B2 | 8/2016 | Showering |
| 9,407,840 B2 | 8/2016 | Wang |
| 9,411,386 B2 | 8/2016 | Sauerwein, Jr. |
| 9,412,242 B2 | 8/2016 | Van et al. |
| 9,418,252 B2 | 8/2016 | Nahill et al. |
| 9,418,269 B2 | 8/2016 | Havens et al. |
| 9,418,270 B2 | 8/2016 | Van et al. |
| 9,423,318 B2 | 8/2016 | Liu et al. |
| D766,244 S | 9/2016 | Zhou et al. |
| 9,443,123 B2 | 9/2016 | Hejl |
| 9,443,222 B2 | 9/2016 | Singel et al. |
| 9,448,610 B2 | 9/2016 | Davis et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,582,696 B2 | 2/2017 | Barber et al. |
| 9,606,581 B1 | 3/2017 | Howe et al. |
| D783,601 S | 4/2017 | Schulte et al. |
| 9,616,749 B2 | 4/2017 | Chamberlin |
| 9,618,993 B2 | 4/2017 | Murawski et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| D790,553 S | 6/2017 | Fitch et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 9,715,614 B2 | 7/2017 | Todeschini et al. |
| 9,734,493 B2 | 8/2017 | Gomez et al. |
| 10,019,334 B2 | 7/2018 | Caballero et al. |
| 10,021,043 B2 | 7/2018 | Sevier |
| 10,327,158 B2 | 6/2019 | Wang et al. |
| 10,410,029 B2 | 9/2019 | Powilleit |
| 10,635,871 B2 * | 4/2020 | Stang .................. G06K 7/10128 |
| 10,956,695 B2 * | 3/2021 | Stang .................... H04R 1/028 |
| 11,373,051 B2 * | 6/2022 | Stang .................. G06K 7/10712 |
| 2007/0063048 A1 | 3/2007 | Havens et al. |
| 2008/0185432 A1 | 8/2008 | Caballero et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0265880 A1 | 10/2010 | Rautiola et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168511 A1 | 7/2012 | Kotlarsky et al. |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0332524 A1 | 12/2013 | Fiala et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein, Jr. |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0097249 A1 | 4/2014 | Gomez et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |

(56) References Cited

U.S. PATENT DOCUMENTS

| | | |
|---|---|---|
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0270196 A1 | 9/2014 | Braho et al. |
| 2014/0270229 A1 | 9/2014 | Braho |
| 2014/0277337 A1 | 9/2014 | Chen |
| 2014/0278387 A1 | 9/2014 | DiGregorio |
| 2014/0278391 A1 | 9/2014 | Braho et al. |
| 2014/0282210 A1 | 9/2014 | Bianconi |
| 2014/0283282 A1 | 9/2014 | Dye et al. |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0039878 A1 | 2/2015 | Barten |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0060544 A1 | 3/2015 | Feng et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |
| 2015/0178536 A1 | 6/2015 | Hennick et al. |
| 2015/0178537 A1 | 6/2015 | El et al. |
| 2015/0181093 A1 | 6/2015 | Zhu et al. |
| 2015/0181109 A1 | 6/2015 | Gillet et al. |
| 2015/0186703 A1 | 7/2015 | Chen et al. |
| 2015/0193644 A1 | 7/2015 | Kearney et al. |
| 2015/0199957 A1 | 7/2015 | Funyak et al. |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0310243 A1 | 10/2015 | Ackley et al. |
| 2015/0310389 A1 | 10/2015 | Crimm et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |

(56) References Cited

U.S. PATENT DOCUMENTS

| | | |
|---|---|---|
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Franz |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini et al. |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0192051 A1 | 6/2016 | DiPiazza et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggerty et al. |
| 2016/0204636 A1 | 7/2016 | Allen et al. |
| 2016/0204638 A1 | 7/2016 | Miraglia et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz et al. |
| 2016/0314294 A1 | 10/2016 | Kubler et al. |
| 2016/0316190 A1 | 10/2016 | McCloskey et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Germaine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress, Jr. |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | D'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Celinder et al. |
| 2017/0193727 A1 | 7/2017 | Van et al. |
| 2017/0200108 A1 | 7/2017 | Au et al. |
| 2017/0200275 A1 | 7/2017 | McCloskey et al. |

FOREIGN PATENT DOCUMENTS

| | | |
|---|---|---|
| JP | 2003-333459 A | 11/2003 |
| WO | 2013/163789 A1 | 11/2013 |
| WO | 2013/173985 A1 | 11/2013 |
| WO | 2014/019130 A1 | 2/2014 |
| WO | 2014/110495 A1 | 7/2014 |

OTHER PUBLICATIONS

US 8,616,454 B2, 12/2013, Havens et al. (withdrawn)
Final Rejection dated Oct. 1, 2020 for U.S. Appl. No. 16/831,534.
Non-Final Office Action received for U.S. Appl. No. 17/248,916, dated Oct. 4, 2021, 10 pages.
Non-Final Rejection dated Jun. 24, 2020 for U.S. Appl. No. 16/831,534.
Notice of Allowance and Fees Due (PTOL-85) dated Aug. 29, 2019 for U.S. Appl. No. 16/052,039.
Notice of Allowance and Fees Due (PTOL-85) dated Dec. 30, 2019 for U.S. Appl. No. 16/052,039.
Notice of Allowance and Fees Due (PTOL-85) dated Nov. 12, 2020 for U.S. Appl. No. 16/831,534.
Notice of Allowance received for U.S. Appl. No. 17/248,916, dated Mar. 10, 2022, 14 pages.
U.S. Patent Application Brian L. Jovanovski et al., filed Jun. 23, 2015, not published yet, Dual-Projector Three-Dimensional Scanner; 40 pages [Previously cited and provided in parent application], U.S. Appl. No. 14/747,490.
U.S. Patent Application for a Laser Scanning Module Employing an Elastomeric U-Hinge Based Laser Scanning Assembly, filed Feb. 7, 2012 (Feng et al.), U.S. Appl. No. 13/367,978.
U.S. Patent Application for a Mobile-Phone Adapter for Electronic Transactions, filed Jul. 10, 2014 (Hejl), U.S. Appl. No. 14/327,827.

(56) References Cited

OTHER PUBLICATIONS

U.S. Patent Application for a System and Method for Indicia Verification, filed Jul. 18, 2014 (Hejl), U.S. Appl. No. 14/334,934.
U.S. Patent Application for Adaptable Interface for a Mobile Computing Device filed Oct. 31, 2014 (Schoon et al.), U.S. Appl. No. 14/529,563.
U.S. Patent Application for Aimer for Barcode Scanning filed Mar. 31, 2015 (Bidwell), U.S. Appl. No. 14/674,329.
U.S. Patent Application for an Axially Reinforced Flexible Scan Element, filed Jul. 25, 2014 (Reublinger et al.); 41 pages, U.S. Appl. No. 14/340,627.
U.S. Patent Application for Apparatus and Methods for Monitoring One or More Portable Data Terminals (Caballero et al.), U.S. Appl. No. 14/725,352.
U.S. Patent Application for Application Independent DEX/UCS Interface filed May 8, 2015 (Pape), U.S. Appl. No. 14/707,123.
U.S. Patent Application for Augumented Reality Enabled Hazard Display filed May 19, 2015 (Venkatesha et al.), U.S. Appl. No. 14/715,672.
U.S. Patent Application for Auto-Contrast Viewfinder for an Indicia Reader filed Dec. 12, 2014 (Todeschini), U.S. Appl. No. 14/568,305.
U.S. Patent Application for Autofocus Lens System for Indicia Readers filed Apr. 29, 2014 (Ackley et al.), U.S. Appl. No. 14/264,173.
U.S. Patent Application for Barcode Reader With Security Features filed Oct. 31, 2014 (Todeschini et al.), U.S. Appl. No. 14/529,857.
U.S. Patent Application for Barcode Scanning System Using Wearable Device With Embedded Camera filed Nov. 5, 2014 (Todeschini), U.S. Appl. No. 14/533,319.
U.S. Patent Application for Calibrating a Volume Dimensioner filed Jun. 16, 2015 (Ackley et al.); 63 pages, U.S. Appl. No. 14/740,373.
U.S. Patent Application for Cargo Apportionment Techniques filed Feb. 5, 2015 (Morton et al.), U.S. Appl. No. 14/614,796.
U.S. Patent Application for Cloud-Based System for Reading of Decodable Indicia filed Jun. 19, 2015 (Todeschini et al.), U.S. Appl. No. 14/744,836.
U.S. Patent Application for Concatenated Expected Responses for Speech Recognition filed Nov. 7, 2014 (Braho et al.), U.S. Appl. No. 14/535,764.
U.S. Patent Application for Cordless Indicia Reader With a Multifunction Coil for Wireless Charging and EAS Deactivation, filed Jun. 24, 2015 (Xie et al.), U.S. Appl. No. 14/748,446.
U.S. Patent Application for Data Collection Module and System filed Jun. 8, 2015 (Powilleit), U.S. Appl. No. 14/732,870.
U.S. Patent Application for Decodable Indicia Reading Terminal With Combined Illumination filed Mar. 18, 2015 (Kearney et al.), U.S. Appl. No. 14/660,970.
U.S. Patent Application for Design Patiern for Secure Store filed Mar. 9, 2015 (Zhu et al.); 23 pages, U.S. Appl. No. 14/405,278.
U.S. Patent Application for Device for Supporting an Electronic Tool on a User's Hand filed Feb. 5, 2015 (Oberpriller et al.), U.S. Appl. No. 14/614,706.
U.S. Patent Application for Device Management Proxy for Secure Devices filed Apr. 1, 2015 (Yeakley et al.), U.S. Appl. No. 14/676,327.
U.S. Patent Application for Device Management Using Virtual Interfaces Cross-Reference to Related Applications filed Jun. 2, 2015 (Caballero), U.S. Appl. No. 14/728,397.
U.S. Patent Application for Device, System, and Method for Determining the Status of Checkout Lanes filed Feb. 23, 2015 (Todeschini), U.S. Appl. No. 14/628,708.
U.S. Patent Application for Dimensioning System Calibration Systems and Methods filed Apr. 6, 2015 (Laffargue et al.), U.S. Appl. No. 14/679,275.
U.S. Patent Application for Dimensioning System With Guided Alignment, filed Aug. 6, 2014 (Li et al.), U.S. Appl. No. 14/453,019.
U.S. Patent Application for Dimensioning System With Multipath Interference Mitigation filed Oct. 21, 2014 (Thuries et al.), U.S. Appl. No. 14/519,179.
U.S. Patent Application for Directing an Inspector Through an Inspection filed Nov. 3, 2014 (Miller et al.), U.S. Appl. No. 14/531,154.

U.S. Patent Application for Docking System and Method Using Near Field Communication filed Apr. 21, 2014 (Showering), U.S. Appl. No. 14/257,364.
U.S. Patent Application for Dynamic Diagnostic Indicator Generation filed Dec. 17, 2014 (Goldsmith), U.S. Appl. No. 14/573,022.
U.S. Patent Application for Electronic Device With Wireless Path Selection Capability filed May 28, 2015 (Wang et al.), U.S. Appl. No. 14/724,134.
U.S. Patent Application for Evaluating Image Values filed May 19, 2015 (Ackley), U.S. Appl. No. 14/715,916.
U.S. Patent Application for Hand-Mounted Indicia-Reading Device with Finger Motion Triggering filed Apr. 1, 2014 (Van Horn et al.), U.S. Appl. No. 14/231,898.
U.S. Patent Application for Handheld Dimensioner With Data-Quality Indication filed Oct. 21, 2014 (Laffargue et al.), U.S. Appl. No. 14/519,233.
U.S. Patent Application for Handheld Dimensioning System With Feedback filed Oct. 21, 2014 (Laffargue et al.), U.S. Appl. No. 14/519,195.
U.S. Patent Application for Handheld Dimensioning System With Measurement-Conformance Feedback filed Oct. 21, 2014 (Ackley et al.), U.S. Appl. No. 14/519,249.
U.S. Patent Application for Hands-Free Human Machine Interface Responsive to a Driver of a Vehicle filed May 6, 2015 (Fitch et al.), U.S. Appl. No. 14/705,012.
U.S. Patent Application for Identifying Inventory Items in a Storage Facility filed Oct. 14, 2014 (Singel et al.), U.S. Appl. No. 14/513,808.
U.S. Patent Application for Imaging Apparatus Comprising IIvtAGE Sensor Array Having Shared Global Shutter Circuitry filed Jun. 19, 2015 (Wang), U.S. Appl. No. 14/744,633.
U.S. Patent Application for Imaging Apparatus Having Imaging Assembly filed May 29, 2015 (Barber et al.), U.S. Appl. No. 14/724,908.
U.S. Patent Application for Indicia Reader filed Apr. 1, 2015 (Huck), U.S. Appl. No. 14/676,109.
U.S. Patent Application for Indicia Reader for Size-Limited Applications filed Mar. 7, 2014 (Feng et al.), U.S. Appl. No. 14/200,405.
U.S. Patent Application for Indicia Reading System Employing Digital Gain Control filed Jun. 18, 2015 (Xian et al.), U.S. Appl. No. 14/742,818.
U.S. Patent Application for Indicia-reader Having Unitary Construction Scanner, filed Jan. 8, 2014 (Colavito et al.), U.S. Appl. No. 14/150,393.
U.S. Patent Application for Indicia-Reading Systems Having an Interface With a User's Nervous System filed Jun. 10, 2015 (Todeschini), U.S. Appl. No. 14/735,717.
U.S. Patent Application for Interactive Indicia Reader, filed Aug. 6, 2014 (Todeschini), U.S. Appl. No. 14/452,697.
U.S. Patent Application for Interactive User Interface for Capturing a Document in an Image Signal filed May 27, 2015 (Showering et al.), U.S. Appl. No. 14/722,608.
U.S. Patent Application for Intermediate Linear Positioning filed May 5, 2015 (Charpentier et al.); 60 pages, U.S. Appl. No. 14/704,050.
U.S. Patent Application for Laser Scanning Code Symbol Reading System, filed Jul. 24, 2014 (Xian et al.), U.S. Appl. No. 14/339,708.
U.S. Patent Application for Media Gate for Thermal Transfer Printers filed Dec. 23, 2014 (Bowles), U.S. Appl. No. 14/580,262.
U.S. Patent Application for Medication Management System filed Apr. 24, 2015 (Sewell et al.), U.S. Appl. No. 14/695,364.
U.S. Patent Application for Method and Apparatus for Reading Optical Indicia Using a Plurality of Data Sources filed May 8, 2015 (Smith et al.), U.S. Appl. No. 14/707,492.
U.S. Patent Application for Method and Application for Scanning a Barcode With a Smart Device While Continuously Running and Displaying an Application on the Smart Device Display filed Mar. 20, 2015 (Todeschini), U.S. Appl. No. 14/664,063.
U.S. Patent Application for Method and System for Recognizing Speech Using Wildcards in an Expected Response filed Oct. 29, 2014 (Braho et al.), U.S. Appl. No. 14/527,191.
U.S. Patent Application for Method and System to Protect Software-Based Network-Connected Devices From Advanced Persistent Threat filed May 6, 2015 (Hussey et al.), U.S. Appl. No. 14/705,407.

(56) References Cited

OTHER PUBLICATIONS

U.S. Patent Application for Method of and System for Detecting Object Weighing Interferences filed Jun. 12, 2015 (Amundsen et al.), U.S. Appl. No. 14/738,038.
U.S. Patent Application for Method of Programming the Default Cable Interface Software in an Indicia Reading Device filed May 29, 2015 (Barten), U.S. Appl. No. 14/724,849.
U.S. Patent Application for Methods for Training a Speech Recognition System filed Feb. 11, 2015 (Pecorari), U.S. Appl. No. 14/619,093.
U.S. Patent Application for Mobile Computing Device With Data Cognition Software, filed Aug. 19, 2014 (Todeschini et al.), U.S. Appl. No. 14/462,801.
U.S. Patent Application for Multifunction Point of Sale Apparatus With Optical Signature Capture filed Jul. 30, 2014 (Good et al.), U.S. Appl. No. 14/446,391.
U.S. Patent Application for Multifunction Point of Sale System filed Mar. 19, 2015 (Van Horn et al.), U.S. Appl. No. 14/662,922.
U.S. Patent Application for Multiple Platform Support System and Method filed Apr. 15, 2015 (Qu et al.), U.S. Appl. No. 14/686,822.
U.S. Patent Application for Multipurpose Optical Reader, filed May 14, 2014 (Jovanovski et al.); 59 pages now abandoned., U.S. Appl. No. 14/277,337.
U.S. Patent Application for Navigation System Configured to Integrate Motion Sensing Device Inputs filed Apr. 2, 2015 (Showering), U.S. Appl. No. 14/676,898.
U.S. Patent Application for Optical Pattern Projector filed Jun. 23, 2015 (Thuries et al.), U.S. Appl. No. 14/747,197.
U.S. Patent Application for Optical Reading Apparatus Having Variable Settings filed Jan. 21, 2015 (Chen et al.), U.S. Appl. No. 14/416,147.
U.S. Patent Application for Portable Electronic Devices Having a Separate Location Trigger Unit for Use in Controlling an Application Unit filed Nov. 3, 2014 (Bian et al. ), U.S. Appl. No. 14/398,542.
U.S. Patent Application for Pre-Paid Usage System for Encoded Information Reading Terminals filed May 13, 2015 (Smith), U.S. Appl. No. 14/710,666.
U.S. Patent Application for Reprogramming System and Method for Devices Including Programming Symbol filed Mar. 18, 2015 (Soule et al.), U.S. Appl. No. 14/661,013.
U.S. Patent Application for Safety System and Method filed Dec. 22, 2014 (Ackley et al.), U.S. Appl. No. 14/578,627.
U.S. Patent Application for Secure Unatiended Network Authentication filed Apr. 24, 2015 (Kubler et al.); 52 pages, U.S. Appl. No. 14/695,923.
U.S. Patent Application for Selective Output of Decoded Message Data filed Jun. 19, 2015 (Todeschini et al.), U.S. Appl. No. 14/745,006.
U.S. Patent Application for Shelving and Package Locating Systems for Delivery Vehicles filed Jan. 6, 2015 (Payne), U.S. Appl. No. 14/590,024.
U.S. Patent Application for Symbol Reading System Having Predictive Diagnostics filed Apr. 29, 2015 (Nahill et al.), U.S. Appl. No. 14/699,436.
U.S. Patent Application for System and Method for Detecting Barcode Printing Errors filed Jan. 14, 2015 (Ackley), U.S. Appl. No. 14/596,757.
U.S. Patent Application for System and Method for Dimensioning filed Oct. 21, 2014 (Ackley et al.), U.S. Appl. No. 14/519,211.
U.S. Patent Application for System and Method for Display of Information Using a Vehicle-Mount Computer filed May 8, 2015 (Chamberlin), U.S. Appl. No. 14/707,037.
U.S. Patent Application for System and Method for Power Management of Mobile Devices filed Apr. 9, 2015 (Murawski et al.), U.S. Appl. No. 14/682,615.
U.S. Patent Application for System and Method for Regulating Barcode Data Injection Into a Running Application on a SIIART Device filed May 1, 2015 (Todeschini et al. ), U.S. Appl. No. 14/702,110.
U.S. Patent Application for System and Method for Reliable Store-and-Forward Data Handling By Encoded Information Reading Terminals filed Mar. 2, 2015 (Sevier), U.S. Appl. No. 14/635,346.
U.S. Patent Application for System for Communication Via a Peripheral Hub filed Apr. 15, 2015 (Kohtz et al.), U.S. Appl. No. 14/687,289.
U.S. Patent Application for Tactile Switch for a Mobile Electronic Device filed Jun. 16, 2015 (Bandringa), U.S. Appl. No. 14/740,320.
U.S. Patent Application for Terminal Having Illumination and Focus Control filed May 21, 2014 (Liu et al.), U.S. Appl. No. 14/283,282.
U.S. Patent Application for Terminal Including Imaging Assembly filed Feb. 25, 2015 (Gomez et al.), U.S. Appl. No. 14/630,841.
U.S. Patent Application for Tracking Battery Conditions filed May 4, 2015 (Young et al.), U.S. Appl. No. 14/702,979.
U.S. Patent Application for Transforming Components of a Web Page to Voice Prompts filed Mar. 26, 2015 (Funyak et al.), U.S. Appl. No. 14/669,280.
U.S. Patent Application for Variable Depth of Field Barcode Scanner filed Sep. 10, 2014 (McCloskey et al.); 29 pages, U.S. Appl. No. 14/483,056.
U.S. Patent Application for Vehicle Mount Computer With Configurable Ignition Switch Behavior filed Mar. 20, 2015 (Davis et al.), U.S. Appl. No. 14/663,638.
U.S. Patent Application for Wireless Mesh Point Portable Data Terminal filed Jun. 18, 2015 (Wang et al.), U.S. Appl. No. 14/743,257.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/468,118 for an Electronic Device Case, filed Sep. 26, 2013 (Oberpriller et al.); 44 pages.
U.S. Appl. No. 29/486,759 for an Imaging Terminal, filed Apr. 2, 2014 (Oberpriller et al.); 8 pages.
U.S. Appl. No. 29/516,892 for Table Computer filed Feb. 6, 2015 (Bidwell et al.); 13 pages.
U.S. Appl. No. 29/519,017 for Scanner filed Mar. 2, 2015 (Zhou et al.); 11 pages.
U.S. Appl. No. 29/523,098 for Handle for a Tablet Computer filed Apr. 7, 2015 (Bidwell et al.); 17 pages.
U.S. Appl. No. 29/524,186 for Scanner filed Apr. 17, 2015 (Zhou et al.); 17 pages.
U.S. Appl. No. 29/525,068 for Tablet Computer With Removable Scanning Device filed Apr. 27, 2015 (Schulte et al.); 19 pages.
U.S. Appl. No. 29/526,918 for Charging Base filed May 14, 2015 (Fitch et al.); 10 pages.
U.S. Appl. No. 29/528,165 for In-Counter Barcode Scanner filed May 27, 2015 (Oberpriller et al.); 13 pages.
U.S. Appl. No. 29/528,590 for Electronic Device filed May 29, 2015 (Fitch et al.); 9 pages.
U.S. Appl. No. 29/528,890 for Mobile Computer Housing filed Jun. 2, 2015 (Fitch et al.); 61 pages.
U.S. Appl. No. 29/529,441 for Indicia Reading Device filed Jun. 8, 2015 (Zhou et al.); 14 pages.
U.S. Appl. No. 29/530,600 for Cyclone filed Jun. 18, 2015 (Vargo et al).
1st Office Action for CN Application No. 201710661845.9 dated Jan. 18, 2023 (10 pages).
Cn Office Action dated Jul. 8, 2023 for CN Application No. 201710661845, 3 page(s).
English Translation of CN Office Action dated Jul. 8, 2023 for CN Application No. 201710661845, 5 page(s).

* cited by examiner

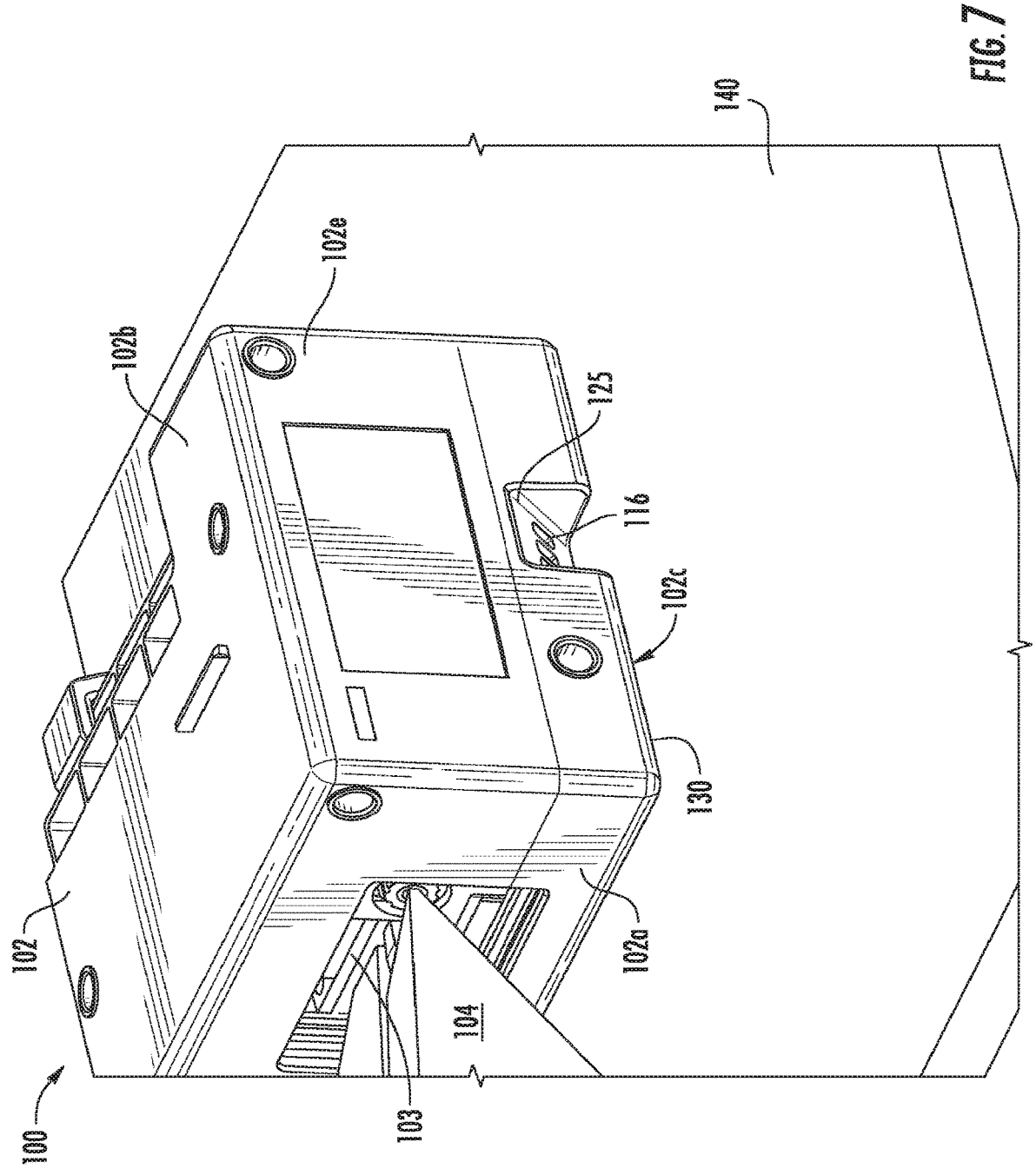

INDICIA READER ACOUSTIC FOR
MULTIPLE MOUNTING POSITIONS

CROSS-REFERENCE TO RELATED
APPLICATION

The present application is a continuation of U.S. patent application Ser. No. 17/248,916 for INDICIA READER ACOUSTIC FOR MULTIPLE MOUNTING POSITIONS filed Feb. 12, 2021, which is a continuation of U.S. patent application Ser. No. 16/831,534 for INDICIA READER ACOUSTIC FOR MULTIPLE MOUNTING POSITIONS filed Mar. 26, 2020, now U.S. Pat. No. 10,956,695 issued Mar. 23, 2021, which is a continuation of U.S. patent application Ser. No. 16/052,039 for INDICIA READER ACOUSTIC FOR MULTIPLE MOUNTING POSITIONS filed Aug. 1, 2018, now U.S. Pat. No. 10,635,871 issued Apr. 28, 2020, which claims priority to and the benefit of Chinese Patent Application for Invention No. 201710661845.9 for an INDICIA READER ACOUSTIC FOR MULTIPLE MOUNTING POSITIONS filed Aug. 4, 2017, each of which is incorporated herein by reference in its entirety.

FIELD OF THE INVENTION

The present invention relates generally to the field of indicia readers. More specifically, the present invention relates to acoustic housings for transmitting audible indications to a user of a fixed-position indicia reader when the reader is mounted in various mounting positions.

BACKGROUND

Generally speaking, businesses have sought to maximize efficiency by using various devices to automate data entry. As one particular example, in the area of inventory management the indicia or symbol reading device (e.g., barcode reader, barcode scanner, RFID reader, etc.) has greatly reduced the time and errors inherent to manual data entry.

Indicia readers may fall within a number of general categories including handheld readers (e.g., mobile devices employed as code symbol readers), laser scan engine barcode readers, and image sensor based barcode readers. One such general category of indicia reader includes the fixed-mount or fixed-position indicia reader which may incorporate image sensor and/or laser-based scan engines.

Fixed-position indicia readers, although also potentially usable in a handheld or unmounted arrangement, are typically directed to a hands-free functional design (i.e., are configured to be mounted or installed on any number of mounting surfaces). Fixed-position readers may be utilized in general or rugged environments for a variety of applications (e.g., retail point-of-sale (POS), kiosks, healthcare, package sorting, direct part mark (DPM), boarding pass scanning, etc.). In one particular use case, fixed-mount indicia reading systems may be employed where the indicia (e.g., barcodes) to be read are presented by an operator or by a machine in approximately the same position and orientation on each read or scan attempt.

Fixed-position indicia readers generally include mounting mechanisms (e.g., threaded inserts and mounting screws) for affixing the reader on a mounting surface such as a wall.

Indicia readers may include visual and/or audio indicators for providing information to a user relating to the present status and/or the various operations of the indicia reader (e.g., failure indications, entering a different mode, completing a successful scan, etc.). Decoding success indications may be provided whereby, for example, the illumination system of the reader is switched off and accompanied by an audible indication (i.e., a tone) from a sound source (e.g., a speaker, beeper, etc.) in response to successfully reading a barcode. Further, illumination of an indicator light (e.g., an LED) from the housing of the reader may be provided as an indicator.

In a hands-free system such as a fixed-mount system (e.g., without a user-trigger mechanism), audible indications may be particularly important for providing information relating to the indicia reader's operations (e.g., that a successful scan has occurred). In the case of an audible indication, the sound signal generally travels from a sound source within the reader's housing through openings on a surface of the housing.

For ease of use and for optimal configurability, a fixed-position reader would ideally be accessible for mounting in a broad range of different positions to a mounting surface; for example, by including mounting mechanisms on all or substantially all of the surfaces of the reader's housing. In the case of audible indications, however, the openings exiting on a surface of the housing (i.e., to "voice" the audio) can be blocked by the mounting surface in certain mounting configurations. To solve this problem, additional sound sources having sound openings on additional surfaces can be added, but the additional audio components and related structural features result in increased complexity and cost during manufacturing, as well as a greater potential for component failure during operation.

Therefore, a need exists for more effective fixed-position indicia reading systems, including but not limited to systems including efficient, cost-effective fixed-mount indicia readers for transmitting audible indications to a user when mounted in different positions to a mounting surface.

SUMMARY

Accordingly, in one aspect, the present invention embraces an indicia reader. The indicia reader includes an indicia-capturing system for acquiring information about indicia within the indicia-capturing system's field of view; an indicia-decoding module configured for decoding indicia information within the indicia-capturing system's field of view, the indicia-decoding module having a signal processor; an audio indicator system having a sound source for providing audible indications relating to operations of the indicia reader; and a housing for supporting and at least partially enclosing the indicia-capturing system, the indicia-decoding module, and the audio indicator system. The housing includes two adjacent mounting surfaces that meet to form a common edge, and a sound port opening formed within a portion of the common edge and the two adjacent surfaces, where the sound port opening is recessed inward with respect to the common edge. The indicia reader is configured to be operatively mounted in at least two different positions by respectively attaching one of the two adjacent surfaces to a support structure, and the sound port opening is in acoustic communication with the sound source of the audio indicator for transmitting audible indications emitted via the audio indicator system when the indicia reader is mounted in either of the at least two different mounting positions.

In an exemplary embodiment, each of the two adjacent mounting surfaces includes at least one mounting insert for use in mounting the indicia reader to a support structure.

In another exemplary embodiment, a chamber is positioned within the housing and at least partially enclosing the audio indicator system and the sound source for acoustically communicating with the sound port opening.

In yet another exemplary embodiment, the chamber encloses the sound source, and the chamber includes a sound conducting channel spanning continuously from the sound source to the sound port opening.

In yet another exemplary embodiment, the sound conducting channel forms a continuous acoustic transmission path for transmitting audible indications emitted via the audio indicator system to the opening.

In yet another exemplary embodiment, the housing is substantially rectangular.

In yet another exemplary embodiment, the sound source is a single beeper.

In yet another exemplary embodiment, the sound port opening is formed within a beveled portion of the common edge joining the two adjacent mounting surfaces of the housing.

In yet another exemplary embodiment, the sound source is a single speaker.

In yet another exemplary embodiment, the indicia reader is a fixed-position indicia reader configured for acquiring information about indicia presented within the indicia-capturing system's field of view when the indicia reader is mounted in either of the at least two mounting positions.

In another aspect, the present invention embraces a housing for an indicia reader. The housing includes an audio indicator system at least partially enclosed within the housing, with the audio indicator system having a sound source for providing audible indications to a user relating to indicia reader operations. The housing also includes two adjacent mounting surfaces where the two adjacent mounting surfaces meet to form a common edge, and a sound conducting channel in acoustic communication with the sound source, where the sound conducting channel has a sound port opening formed within a beveled portion of the common edge which joins the two adjacent surfaces. The housing is configured to be mounted in at least two different mounted positions by respectively attaching one of the two adjacent mounting surfaces to a support structure. The sound conducting channel is configured to transmit audible indications emitted via the sound source to the sound port opening when the housing is mounted in either of the at least two different mounted positions.

In an exemplary embodiment, the housing includes and at least partially encloses an indicia-capturing system for acquiring information about indicia within the indicia-capturing system's field of view.

In another exemplary embodiment, the housing includes and at least partially encloses an indicia-decoding module configured for decoding indicia information within the indicia-capturing system's field of view, the indicia-decoding module comprising a signal processor.

In yet another exemplary embodiment, the housing is substantially rectangular.

In yet another exemplary embodiment, the sound source is a single beeper.

In yet another exemplary embodiment, the sound conducting channel includes a chamber positioned within the housing and at least partially enclosing the audio indicator system.

In yet another exemplary embodiment, the chamber encloses the sound source and the sound conducting channel spans continuously to the sound port opening.

In another aspect, the present invention embraces a fixed-position indicia reader. The fixed-position indicia reader includes an indicia-capturing system for acquiring information about indicia presented within the indicia-capturing system's field of view when the fixed-position indicia reader is mounted to a support structure; an audio indicator system for providing audible indications relating to indicia reader operations, the audio indicator system having a sound source comprising a single beeper; and a housing for supporting and at least partially enclosing the indicia-capturing system and the audio indicator system. The housing includes two adjacent mounting surfaces where the two adjacent mounting surfaces meet to form a common edge, and a sound port opening formed within a beveled portion of the common edge joining the two adjacent mounting surfaces. The housing is configured for operatively mounting the fixed-position indicia reader to a support structure in at least two different mounting positions by respectively attaching one of the two adjacent mounting surfaces to a support structure. The sound port opening is in acoustic communication with the sound source for transmitting audible indications emitted from the sound source to the sound port opening when the housing is mounted in either of the at least two different mounting positions.

In an exemplary embodiment, the housing comprises, and at least partially encloses, an indicia-decoding module configured for decoding indicia information within the indicia-capturing system's field of view, the indicia-decoding module including a signal processor.

In another exemplary embodiment, the sound port opening is in acoustic communication with the sound source via a sound conducting channel spanning continuously from the sound source to the sound port opening.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 7 is a left perspective view depicting the exemplary mountable indicia-reader mounted to a support structure.

DETAILED DESCRIPTION

The present invention embraces fixed-position indicia reading systems including mountable indicia readers having acoustic housings for effectively transmitting audible indications from a single sound source from various mounting positions or configurations.

In an exemplary embodiment, the fixed-position indicia reader is configured to be operatively mounted in at least two different positions by respectively attaching one of two adjacent mounting surfaces to a support structure. The exemplary mountable indicia reader also includes a sound port that is in acoustic communication with a sound source for effectively transmitting audible indications to a user when the fixed-position indicia reader is mounted in either of the at least two different mounting positions.

Indicia reading devices are often employed to decode indicia such as barcodes. A barcode is a machine-readable representation of information in graphic format. Traditionally, a barcode is a series of parallel bars and spaces of varying widths (e.g., a linear barcode or 1D barcode).

More recently, there has been an increase in the use of alternatives to the linear barcode. For example, matrix codes (e.g., 2D barcodes, QR Code, Aztec Code, Data Matrix, etc.) and Optical Character Recognition (OCR) have enjoyed increasing popularity. As used herein, terms such as indicia, barcode, and/or code symbol are intended in their broadest sense to include linear barcodes, matrix barcodes, and OCR-enabled labels, but are not limited to these examples.

One category of indicia readers includes laser-based readers, generally including a laser diode assembly generating a laser light beam and a moving mirror for sweeping the laser light beam across a decodable symbol, whereby a signal is generated corresponding to the decodable symbol.

Image sensor-based readers include multi-element image sensors such as CID, CMOS, or CCD image sensors and an imaging optic for focusing an image onto the image sensor. In the operation of an image sensor-based reader, an image of a decodable symbol is focused on an image sensor and a signal is generated corresponding to the symbol. Image sensor elements may be arrayed in a line or in a rectangular matrix or area. Area image sensors, for example, capture a digital picture and use software algorithms to find and decode one or more symbols.

Image sensor-based readers are, generally, more durable and offer additional features relative to laser scan engine readers. Features and functions which have been incorporated into image sensor-based barcode readers include image processing capabilities.

Figure 1:
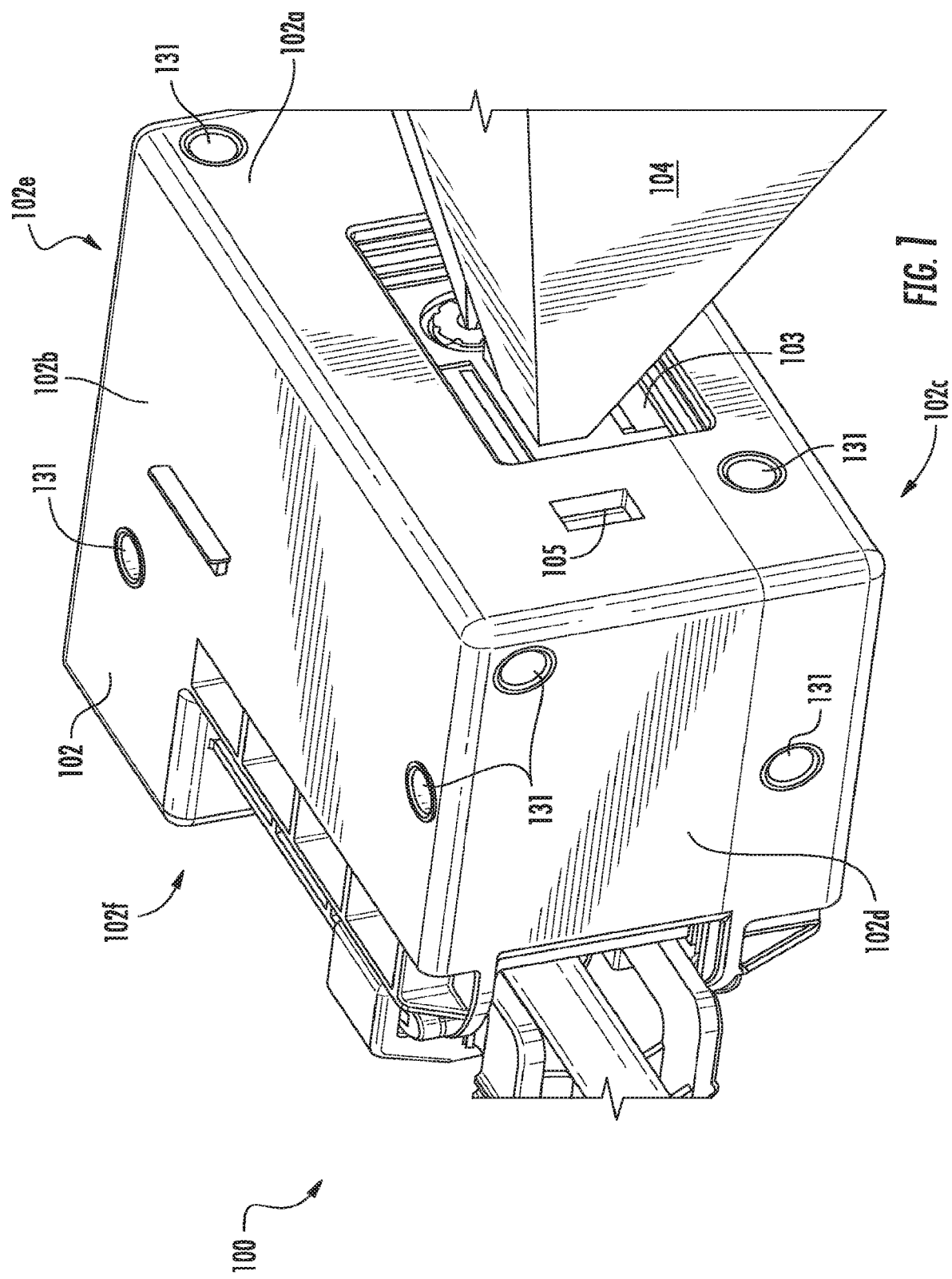
FIG. 1 is a front perspective view depicting an exemplary mountable indicia-reader.
Figure 2:
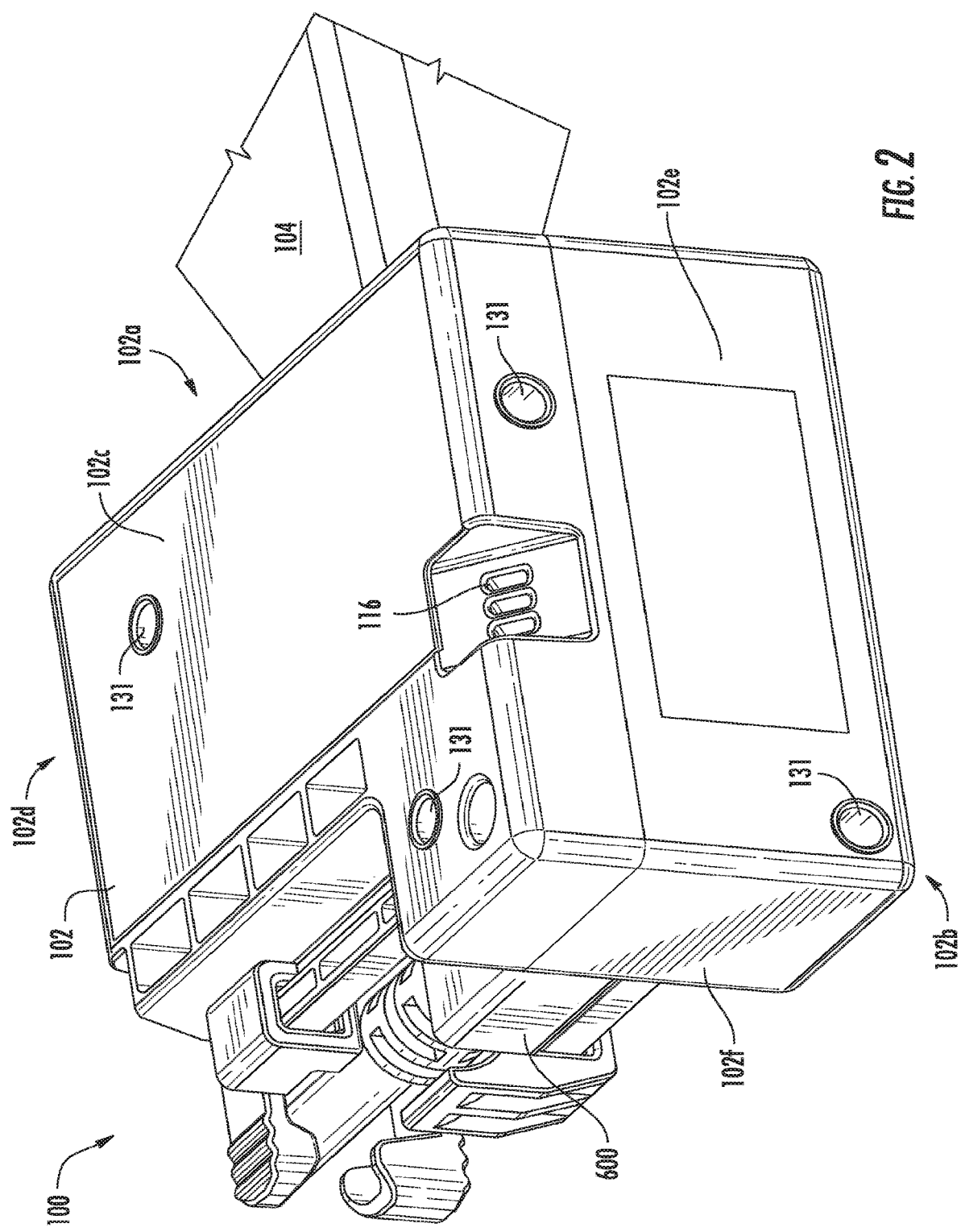
FIG. 2 is a rear perspective view depicting the exemplary mountable indicia-reader.
Figure 6:
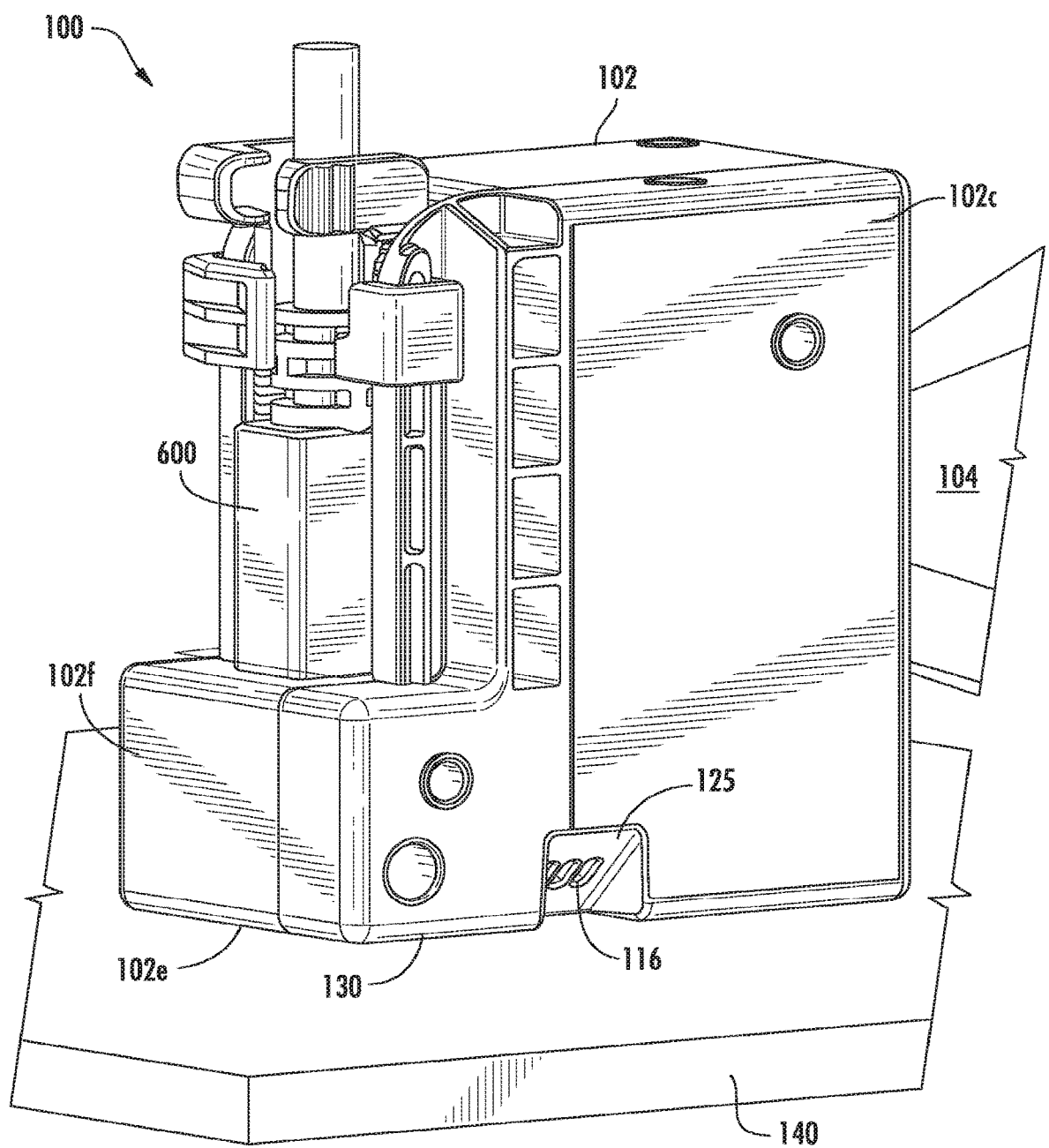
FIG. 6 is a bottom perspective view depicting the exemplary mountable indicia-reader mounted to a support structure.

With reference to the drawings, FIGS. 1 and 2 depict perspective views an exemplary indicia-reading device according to the present invention, in this case a fixed-position or mountable indicia reader 100 arranged primarily for fixed-position reading. For ease of reference, FIGS. 1 and 2 depict the exemplary reader 100 in an unmounted arrangement. FIGS. 6 and 7, discussed below, depict a mounted arrangement.

The exemplary mountable indicia reader 100 includes a housing 102. The housing 102 has front surface 102a including a light transmission window 103 integrated within the front surface portion of the housing 102. The housing 102 further includes a top surface 102b, a bottom surface 102c, a right-side surface 102d, a left-side surface 102e, and a back-side surface portion 102f. The back-side of the housing incorporates a cable 600 electronically connected to the reader 100 for operation in an exemplary indicia reading system, as further described below with reference to FIG. 4.

Respective surfaces of the indicia reader 100 include mounting mechanisms 131 for affixing or mounting the reader on a mounting surface (e.g., a wall, a table, etc.). In one example, the mounting mechanisms 130 include threaded inserts and corresponding mounting screws, but any of a range of acceptable mechanisms or fasteners may be used. In the present case, the fixed-position reader 100 includes mounting mechanisms 130 on each respective surface except for the back-side portion including connector cable 600 (e.g., substantially all of the surfaces of the reader's housing). Thus, the fixed-position reader 100 is advantageously available for mounting in a broad range of different positions to a mounting surface.

As further described below with reference to FIGS. 5-7, the exemplary mountable indicia reader 100 includes sound ports 116 (FIG. 2) that are in acoustic communication with an audio indicator system having a sound source for transmitting audible indications to a user when the fixed-position indicia reader is mounted in different positions.

Behind the light transmission window 103, the housing 102 may include may include one or more light sensing assemblies (i.e., indicia-capturing systems), such as an image sensor-based reading engine and/or a laser scan engine that is utilized for reading indicia, symbols, images, and the like.

Figure 3:
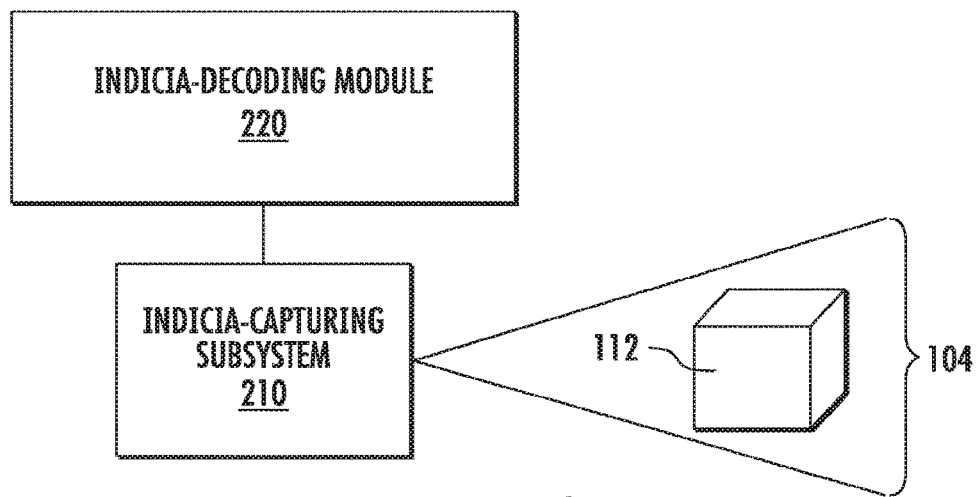
FIG. 3 is a schematic block diagram representative of a system design for the exemplary mountable indicia-reader.

The exemplary mountable indicia reader 100, when positioned in a fixed or mounted position (e.g., FIGS. 6 and 7), may operate in a pass-through scanning mode whereby objects 112 bearing indicia are passed within a field of view 104 to activate an indicia reading system, for example, as generally depicted schematically at FIG. 3. The exemplary reader 100, when positioned in a fixed or mounted position, may also operate in a presentation scanning mode whereby placing objects into an activation range of infrared (IR) sensor 105 (FIG. 1) activates an indicia reading system to capture or scan indicia within a field of view 104, decode the indicia, and send relevant data (e.g., via connector 600).

The reader 100 could also be configured for manual activation or operation, such that a manually-actuated button or other user-interface mechanism (e.g., keyboard, trigger, etc.) may be utilized to activate an indicia reading system (not explicitly shown).

The exemplary indicia reader, in this case a mountable, fixed-position reader 100, has an indicia reading system that includes an indicia-capturing system 210, as depicted at FIG. 3. The indicia-capturing system 210 acquires information about indicia within its field of view 104. Typically, the indicia reader 100 is mounted on a surface and functions in an automatic mode (e.g., presentation mode) whereby an object 112 that bears an indicium may be placed within the field of view 104 of the indicia-capturing system 210. The indicia reader 100, however, could also be utilized in a handheld mode where the indicia-capturing system 210 may be manipulated to reposition the field of view 104 to include the object 112 bearing the indicium.

In some instances, the indicia-capturing system 210 may be a laser-based system that sweeps a light beam (e.g., a laser beam) across the field of view 104 and then receives the optical signals that reflect or scatter off the indicium. Typically, the optical signal is received using a photoreceptor (e.g., photodiode) and is converted into an electrical signal. The electrical signal is an electronic representation of the indicia information (e.g., the data represented by the indicia). When in the form of an electrical signal, this information can be processed (e.g., decoded).

The indicia-decoding module 220 is configured to decode indicia information (e.g., electrical signal or digital image) acquired by the indicia-capturing subsystem 210. Although the indicia reader 100 has been described as including an indicia-decoding module 220 as shown, this is only by way of example. In other contemplated embodiments, the indicia-reader 100 may include an indicia-capturing system 210 and transmit the acquired optical information for processing or decoding at an external host or similar system (e.g., via connector 600). References contained herein to electrical signals are intended broadly to also encompass digital images capable of being electronically processed (e.g., an image-processing computer processor).

Figure 4:
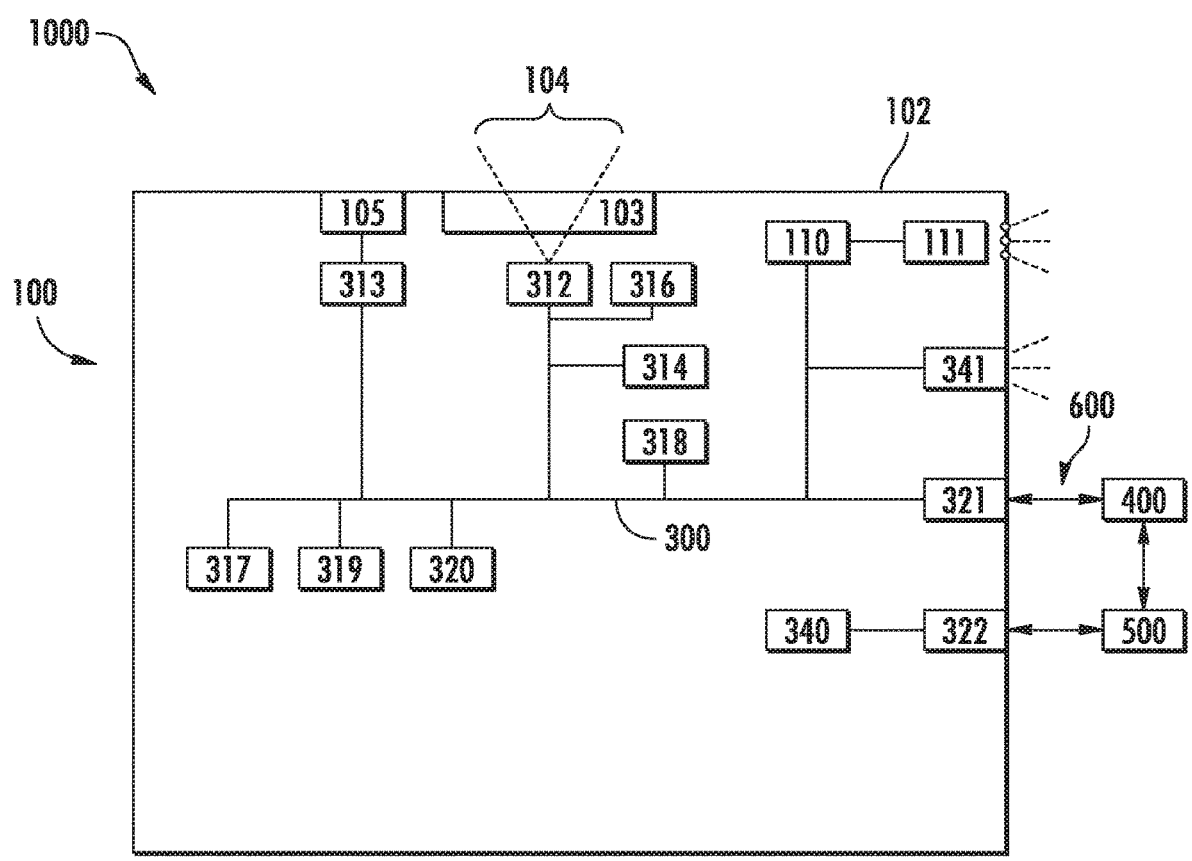
FIG. 4 is a schematic block diagram representative of an exemplary indicia-reading system including an exemplary mountable indicia-reader.

FIG. 4 is a schematic block diagram representing various exemplary subsystems or components of an exemplary indicia-reading system 1000, and which includes the systems of indicia reader 100 as generally depicted schematically and described with respect to FIG. 3. Although FIG. 4 includes schematic representations of components for an image-sensor based reader 100, as noted above the exemplary indicia reader 100 may alternatively (or in addition) include a laser-based scanning arrangement. With reference to FIG. 4, a border illustrates housing 102 with the exemplary components depicted as positioned within the border being components disposed, at least partially, within housing 102.

The exemplary indicia-reading system 1000 of FIG. 4 includes an image formation and detection mechanism (IFD) 312 (i.e., a camera) having imaging optics for producing a field of view 104. The camera 312 may include an area-type image detection array for detecting imaged light reflected off an object (e.g., object 112 as shown at FIG. 3).

Further, the exemplary indicia-reading system 1000 includes an illumination system 316 (e.g., having one or more LEDs) for producing illumination within the field of view 104. The emitted illumination may be transmitted through a narrow-band transmission-type optical filter.

An object detection subsystem 313 is in operative communication with IR sensor 105 for producing an IR-based object detection field (e.g., for activating an indicia reading system when objects are passed within the detection field).

A communication assembly 321 is configured for receiving input and for outputting processed image data and related information to an external host computer 400 or other device (e.g., via a wired or wireless connection). For example, the communication assembly 321 may transmit/receive data via connector 600.

Each respective subsystem of the exemplary indicia-reading device 100 may be operatively interfaced via a controller 314, and the components coupled to a system bus 300.

As shown, the exemplary indicia-reading device 100 includes an audio indicator system 110 including a sound source 111 for providing information to a user relating to the present status and/or the various operations of the indicia reader (e.g., failure indications, entering a different mode, completing a successful scan, etc.). Further, illumination of an indicator light (e.g., an LED) of the housing 102 from illumination indicator system 341 may be provided as a status indicator relating to reader operations.

Referring to further aspects of the exemplary indicia reading system 1000, the exemplary mountable indicia reader 100 can include a central processing unit (CPU) 318 for processing digital signals output by the camera 312 or other/additional light sensing assemblies. The indicia reader 100 may also include random access memory (RAM) 217, a read only memory 219, and a storage memory 220 (e.g., flash memory, a hard drive, etc.).

For attempting to decode indicia information, CPU 318 can process digital signal image data. The data corresponds to a line of pixel positions (e.g., a row, a column, or a diagonal set of pixel positions) in the case of an image-sensor-array-based light sensing assembly of FIG. 4. Otherwise, a digital signal representing an indicium can correspond to a scan path in the case of a laser-scanning-based light sensing assembly to determine a spatial pattern of dark and light cells. The CPU 218 can convert each light and dark cell pattern determined into a character or character string via table lookup.

In other contemplated embodiments, the indicia-reader 100 may capture and transmit the acquired optical information for processing or decoding at an external host or similar system (e.g., via a wired or wireless connection).

Where a decodable indicia representation is, for example, a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup.

Regarding CPU 318, CPU 318 may run an operating system (OS) and a plurality of applicable device drivers via a communication interface 321.

Indicia reader 100 can include a power supply 322 that supplies power to a power grid 340 to which the internal electrical components (e.g., integrated circuits) can be connected. Power supply 322 can be coupled to internal or external power sources 500; e.g. a battery, a serial interface (e.g., USB RS232), and/or an AC/DC transformer.

Figure 5:
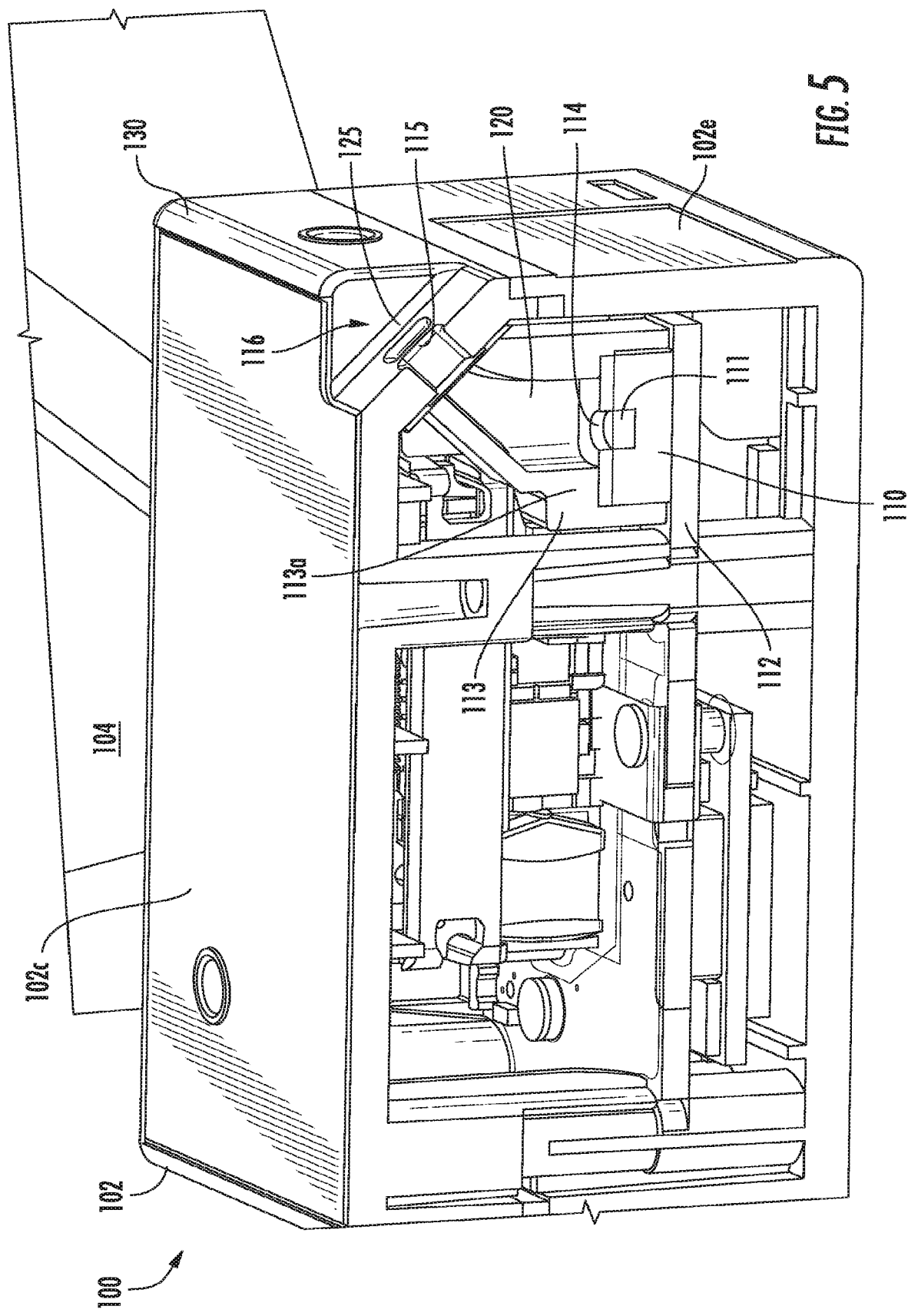
FIG. 5 is a rear perspective internal view depicting the exemplary mountable indicia-reader.

FIG. 5 is a rear-perspective internal view (i.e., a cutaway view) of the exemplary mountable reader 100. FIG. 5 illustrates the acoustic structure and related features of the exemplary housing 102. An audio indicator system 110 including a sound source 111 is disposed within the housing and positioned on a substrate 112 (e.g., an integrated circuit board). The audio indicator system 110 is configured and arranged for providing information to a user relating to the present status and/or the various operations of the indicia reader, for example, by emitting a tone after completion of a successful scan.

A chamber component 113 within the housing is shown enclosing portions of the audio indicator system 110 and surrounding the sound source 111. For example, the chamber may include a recess 113a forming an interference or snap fit onto a section of the audio indicator system 110 protruding from the substrate 112 in order to mate with the substrate 112. The chamber may be formed via injection molding of a durable rubber or elastomeric material.

As shown, the chamber 113 forms a sound conducting channel 120 (e.g., an acoustic-waveguide, sound conducting conduit, etc.) spanning from first end 114 about the sound source 111 to a second end 115 about the sound port openings 116. Thus, the sound conducting channel 120 is in acoustically communication with the sound port opening 116 for communicating audible indications emitted via the audio indicator system 110 to a user.

As depicted in the drawings, the exemplary housing 102 has substantially rectangular appearance, generally a rectangular box or prism, notwithstanding the connector 600 features and slightly rounded edges (e.g., for ease of use and handling). The sound port segment 125 (e.g., including the sound port openings 116 or beeper holes) is positioned within a void space along an edge 130 where two adjacent surfaces 102c, 102e meet. In this regard, the sound port segment 125 is inset, extending inward with regard to the outer portion of the adjacent edge 130.

As depicted, the sound port openings 116 are formed within a beveled portion or segment 125 of the common edge 130 joining the two adjacent mounting surfaces 102c, 102e of the housing 102. Thus, even though the sound source 111 of the audio indicator system 110 may comprise a single speaker, beeper, or other sound emitting mechanism, the acoustic housing 102 can provide sound indications to a user when mounted on either of the two adjacent mounting surfaces 102c, 102e in various mounted positions (e.g., at least two different mounting positions).

FIGS. 6 and 7, respectively, show the exemplary fixed-position reader 100 mounted onto a supporting surface 140 about the left-side surface 102e (FIG. 6) and the bottom surface 102c (FIG. 7). As illustrated, the sound ports 116 are not being blocked by the mounting surface 140 in either arrangement. Thus, audio signals emitted from the sound source 111 are effectively conducted through the channel acoustic structure 120 (FIG. 5) and transmitted through the sound ports 116 formed in the indicia reader housing 102 at recessed segment 125, therefore increasing the sound projection and/or the ability of a user to perceive the audible indications.

As shown and described herein, the exemplary acoustic housing for a fixed-position indicia reader includes a sound channel and sound ports formed about recessed or inset segment joining two adjacent mounting surfaces of the housing. Accordingly, even when the sound source comprises a single emitter (e.g., a beeper or speaker), the fixed-position indicia reader can transmit audible indications to a user when the indicia reader is mounted to a support surface on either of the two adjacent mounting surfaces without the sound being blocked by the support surface.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. Nos. 8,727,223; D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;

U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;

U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTI-PURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. Patent Application No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. Patent Application No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.); U.S. Patent Application No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the

The invention claimed is:

1. An indicia reader, comprising:
a CMOS image sensor;
a processor configured to decode indicia information;
an illumination system comprising one or more light emitting diodes;
an audio indicator system comprising a sound source, wherein the sound source is configured to provide audible indications; and
a housing for at least partially enclosing the CMOS image sensor, the processor, the illumination system, and the audio indicator system, the housing comprising:
a front surface having a light transmission window;
a back surface having a port such that a cable may electronically connect to the indicia reader;
two adjacent mounting surfaces that meet to form a common edge;
a sound conducting channel in acoustic communication with the sound source, wherein the sound conducting channel comprises a sound port opening, and wherein the sound port opening is recessed inward with respect to the common edge; and
wherein the indicia reader operates in presentation mode or handheld mode.

2. The indicia reader of claim 1, wherein the indicia reader further comprises a mounting mechanism.

3. The indicia reader of claim 2, wherein the mounting mechanism comprises threaded inserts.

4. The indicia reader of claim 1, wherein the indicia information is a one-dimensional barcode symbology or a two-dimensional barcode symbology.

5. The indicia reader of claim 1, wherein the indicia reader is configured to attempt to decode indicia information by locating a finder pattern using a feature detection algorithm.

6. The indicia reader of claim 1, wherein the housing is substantially rectangular.

7. The indicia reader of claim 1, wherein the sound source comprises a beeper.

8. The indicia reader of claim 1, wherein the audible indications indicate a successful decode of indicia information.

9. The indicia reader of claim 1, wherein the sound source comprises a single speaker.

10. The indicia reader of claim 1, wherein the indicia reader is a fixed-position indicia reader configured for acquiring information about indicia information presented within a field of view.

11. A housing for an indicia reader, comprising:
a front surface having a light transmission window;
a back surface having a port such that a cable may electronically connect to the indicia reader;
two adjacent mounting surfaces that meet to form a common edge;
a sound conducting channel in acoustic communication with a sound source, wherein the sound conducting channel comprises a sound port opening, and wherein the sound port opening is recessed inward with respect to the common edge;
wherein the housing at least partially encloses an audio indicator system comprising the sound source;
wherein the housing is configured to be mounted in at least two different mounted positions by respectively attaching one of the two adjacent mounting surfaces to a support structure; and
wherein the sound conducting channel is configured to transmit audible indications emitted via the sound source to the sound port opening when the housing is mounted in either of the at least two different mounted positions.

12. The housing of claim 11, wherein the housing comprises and at least partially encloses an indicia-capturing system for acquiring information about decodable indicia.

13. The housing of claim 12, wherein the indicia-capture system includes at least a processor and CMOS image sensor.

14. The housing of claim 11, wherein the housing is substantially rectangular.

15. The housing of claim 11, wherein the sound source comprises a beeper.

16. The housing of claim 11, wherein the sound source comprises a single speaker.

17. The housing of claim 11, wherein the audible indications indicate a successful decode of indicia information.

18. A fixed-position indicia reader, comprising:
a CMOS image sensor;
a processor configured to decode indicia information;
an illumination system comprising one or more light emitting diodes;
an audio indicator system comprising a sound source, wherein the sound source is configured to provide audible indications; and
a housing for at least partially enclosing the CMOS image sensor, the processor, the illumination subsystem, and the audio indicator system, the housing comprising:
a front surface having a light transmission window;
a back surface having a port such that a cable may electronically connect to the indicia reader;
two adjacent mounting surfaces that meet to form a common edge;
a sound conducting channel in acoustic communication with the sound source, wherein the sound conducting channel comprises a sound port opening, and wherein the sound port opening is recessed inward with respect to the common edge; and
wherein the fixed-position indicia reader is configured to operate in presentation mode or handled mode.

19. The fixed-position indicia reader of claim 18, wherein the housing is configured for mounting the fixed-position indicia reader to a support structure in at least two different mounting positions by respectively attaching one of the two adjacent mounting surfaces to a support structure.

20. The fixed-position indicia reader of claim 18, wherein the housing at least partially encloses a CMOS image sensor and a processor.

* * * * *